United States Patent
Dong

(10) Patent No.: US 12,520,248 B2
(45) Date of Patent: Jan. 6, 2026

(54) COMMUNICATION METHOD AND ELECTRONIC DEVICE

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 379 days.

(21) Appl. No.: 18/035,029

(22) PCT Filed: Nov. 5, 2020

(86) PCT No.: PCT/CN2020/126763
§ 371 (c)(1),
(2) Date: May 2, 2023

(87) PCT Pub. No.: WO2022/094861
PCT Pub. Date: May 12, 2022

(65) Prior Publication Data
US 2024/0007966 A1   Jan. 4, 2024

(51) Int. Cl.
*H04W 52/00* (2009.01)
*H04W 52/30* (2009.01)
*H04L 27/34* (2006.01)
*H04W 84/12* (2009.01)

(52) U.S. Cl.
CPC ......... *H04W 52/30* (2013.01); *H04L 27/3405* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2014/0219397 A1* | 8/2014 | Chen | H04L 27/34 375/329 |
| 2014/0269873 A1* | 9/2014 | Tahir | H04W 52/241 375/227 |
| 2015/0382274 A1* | 12/2015 | Logvinov | H04W 52/46 370/311 |
| 2019/0014356 A1* | 1/2019 | Rieger | H04N 21/2402 |

(Continued)

FOREIGN PATENT DOCUMENTS

| | | |
|---|---|---|
| CN | 105191202 A | 12/2015 |
| CN | 108432299 A | 8/2018 |
| CN | 111629430 A | 9/2020 |

OTHER PUBLICATIONS

PCT/CN2020/126763, English translation of Search Report dated Aug. 4, 2021, 2 pages.

(Continued)

*Primary Examiner* — Brandon M Renner
(74) *Attorney, Agent, or Firm* — Cozen O'Connor

(57) ABSTRACT

A communication method includes: determining a first message frame, in which the first message frame includes an uplink multi-user power capability information element; the uplink multi-user power capability information element includes a second information identifier of a relative maximum transmission power of a 4096 QAM modulation mode; and the second information identifier being configured to indicate a maximum power value that the station sends an uplink data frame; and sending the first message frame.

20 Claims, 2 Drawing Sheets

(56) References Cited

U.S. PATENT DOCUMENTS

2020/0319324 A1* 10/2020 Au .................. H04W 48/16
2021/0235319 A1*  7/2021 Huang ............. H04L 1/0009
2023/0319629 A1* 10/2023 Ko .................. H04L 1/0007
                                                    370/230

OTHER PUBLICATIONS

Chinese Patent Application No. 2020800030123 Office Action dated Jul. 31, 2024, 8 pages.
Chinese Patent Application No. 2020800030123 English translation of Office Action dated Jul. 31, 2024, 14 pages.

* cited by examiner

COMMUNICATION METHOD AND ELECTRONIC DEVICE

CROSS-REFERENCE TO RELATED APPLICATION

This application is the U.S. national phase of International Application No. PCT/CN2020/126763, filed on Nov. 5, 2020, the entire content of which is incorporated herein by reference.

TECHNICAL FIELD

The disclosure relates to the field of communication, in particular to a communication method in wireless communication.

BACKGROUND

The Institute of Electrical and Electronic Engineers (IEEE) has established the Task Group (TG) IEEE802.11be to study the next generation (IEEE802.11a/b/g/n/ac) Wi Fi technology, with a study scope including 320 MHz bandwidth transmission, aggregation and collaboration of multiple frequency bands. This goal of this study group is to improve the rate and throughput by at least four times compared to the IEEE802.11ax standard in the related art. Its main application scenarios include video transmission, Augmented Reality (AR), Virtual Reality (VR), etc.

The aggregation and collaboration of multiple frequency bands means that devices communicate simultaneously in 2.4 GHz, 5.8 GHz and 6-7 GHz frequency bands. For simultaneous communication between devices in multiple frequency bands, a new medium access control (MAC) mechanism may be defined for management. In addition, it is expected to support low latency transmission in IEEE802.11be.

In the discussion of the IEEE802.11be standard, the maximum bandwidth supported may be 320 MHz (160 MHz+160 MHz), and in addition, it may also support 240 MHz (160 MHz+80 MHz) and the bandwidth supported in the IEEE802.11ax standard.

SUMMARY

According to embodiments of the disclosure, a communication method is provided. The communication method is performed by a station, and includes: determining a first message frame and sending the first message frame. The first message frame includes an uplink multi-user power capability information element. The uplink multi-user power capability information element includes a second information identifier of a relative maximum transmission power of a 4096 quadrature amplitude modulation (QAM) mode. The second information identifier is configured to indicate a maximum power value that the station sends an uplink data frame.

According to embodiments of the disclosure, a communication method is provided. The communication method is performed by an access point, and includes: receiving a first message frame from a station. The first message frame includes an uplink multi-user power capability information element. The uplink multi-user power capability information element includes a second information identifier of a relative maximum transmission power of a 4096 quadrature amplitude modulation (QAM) mode. The second information identifier is configured to indicate a maximum power value that the station sends an uplink data frame.

According to embodiments of the disclosure, an electronic device is provided. The electronic device includes: a memory, a processor, and a computer program stored on the memory and executable on the processor. The method described above is implemented when the processor executes the computer program.

According to embodiments of the disclosure, a computer-readable storage medium is provided. The computer-readable storage medium has a computer program stored thereon. The method described above is implemented when the computer program is executed by a processor.

The technical solutions provided by the embodiments of the disclosure can improve spectral efficiency and network throughput.

BRIEF DESCRIPTION OF THE DRAWINGS

The above and other features of embodiments of the disclosure will become apparent by describing the embodiments of the disclosure in detail with reference to the accompanying drawings, in which.

DETAILED DESCRIPTION

Following description with reference to accompanying drawings is provided to assist in a comprehensive understanding of various embodiments of the disclosure limited by accompanying claims and their equivalents. The various embodiments of the disclosure include various specific details, but these specific details are only considered exemplary. In addition, for clarity and conciseness, descriptions of well-known technologies, functions, and constructions can be omitted.

The terms and expressions used in the disclosure are not limited to literal meanings, and are only used by the inventor to enable a clear and consistent understanding of the disclosure. Therefore, for those skilled in the art, the description of various embodiments of the disclosure is provided for an illustrative purpose only, and not for a limiting purpose.

It should be understood that, unless the context clearly indicates otherwise, the singular forms "one", "a", "side" and "the" in singular forms used here can also include the plural forms. It should be further understood that the term "including" used in the disclosure refers to the presence of the described features, integers, steps, operations, elements, and/or components, but does not exclude the presence or addition of one or more other features, integers, steps, operations, elements, components, and/or their groups.

It will be understood that although the terms "first", "second", etc. can be used to describe various elements in the description, these elements should not be limited by these terms. These terms are only used to distinguish one element from another. Therefore, without departing from the teachings of the exemplary embodiments, the first element discussed below can be referred to as the second element.

It should be understood that when a component is referred to as "connected" or "coupled" to another component, it can be directly connected or coupled to other components, or there can also be an intermediate component. In addition, the term "connection" or "coupling" used here can include wireless connection or wireless coupling. The term "and/or" or the expression "at least one/at least one of . . . " used herein includes any and all combinations of one or more related listed items.

Unless defined otherwise, all terms used herein (including technical and scientific terms) have the same meaning as the general understanding of those skilled in the art to which the disclosure belongs.

In the IEEE802.11be standard, a 4K quadrature amplitude modulation (QAM) mode (i.e. 4096 QAM) may be introduced. However, the IEEE802.11ax standard cannot support such modulation method. In addition, the IEEE802.11be standard is only applicable to single-link transmission, and the IEEE802.11be standard needs to further support multi-link communication (simultaneously) and consider the problem of mutual interference between multiple links. Therefore, existing standards cannot meet the requirements of the IEEE802.11be standard.

Figure 1:
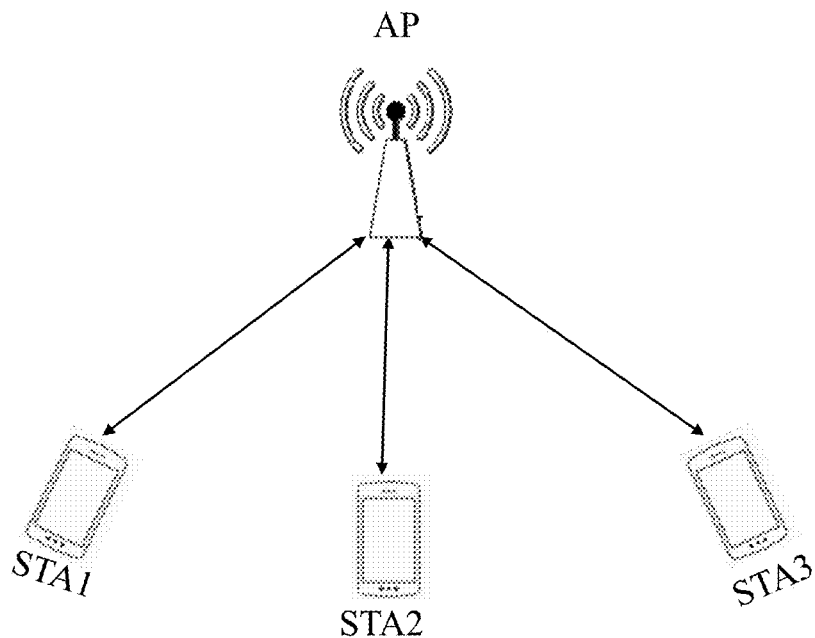
FIG. 1 is a schematic diagram showing a wireless communication scenario according to an embodiment of the disclosure.

FIG. 1 is a schematic diagram showing a wireless communication scenario.

In a wireless local area network, a basic service set (BSS) can be composed of an access point (AP) and one or more stations (STA) that communicate with the AP. A basic service set can be connected to a distribution system (DS) through its AP, and then connected to another basic service set, forming an extended service set (ESS).

The AP is a wireless switch used in a wireless network and is also a core of the wireless network. An AP device can be used as a wireless base station, mainly as a bridge to connect wireless and wired networks. By utilizing this access point AP, wired and wireless networks can be integrated.

For example, the AP can include software applications and/or circuits to enable other types of nodes in the wireless network to communicate with both external and internal of the wireless network through the AP. For example, the AP can be a terminal device or a network device equipped with a Wi Fi (Wireless Fidelity) chip.

For example, a station (STA) can include but is not limited to: a cellular phone, a smartphone, a wearable device, a computer, a personal digital assistant (PDA), a personal communication system (PCS) device, a personal information manager (PIM), a personal navigation device (PND), a global positioning system, a multimedia device, an Internet of Things (IoT) device, etc.

FIG. 1 shows that one AP communicates with three stations (STA1, STA2, STA3), however this is only exemplary and the embodiments of the disclosure are not limited to this. For example, the AP and the station can have any number and/or type.

Figure 2:
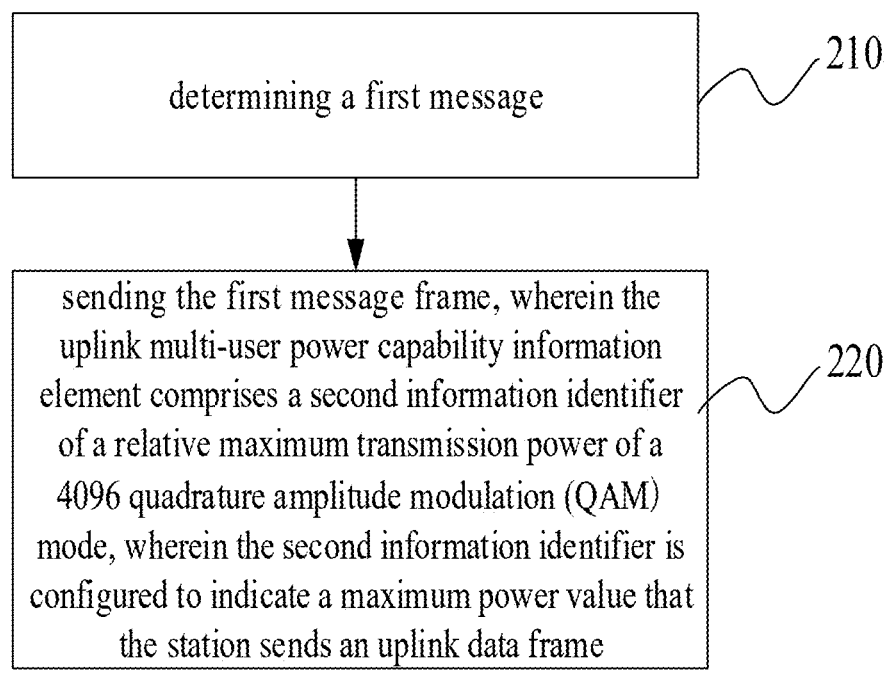
FIG. 2 is a flowchart of a communication method according to an embodiment of the disclosure.

FIG. 2 is a flowchart of a communication method according to an embodiment of the disclosure. The communication method shown in FIG. 2 can be performed by a station (such as the STA1, STA2, and STA3 in FIG. 1).

As illustrated in FIG. 2, in step 210, a first message frame may be determined. In some embodiments of the disclosure, there are many ways to determine the first message frame. For example, the station can generate the first message frame based on at least one of the following conditions: a network condition, a load condition, hardware capability of a sending/receiving device, a service type, and relevant agreement provisions, which is not limited in detail in embodiments of the disclosure. In the embodiments of the disclosure, the station can obtain the first message frame from an external device, which is not limited in detail in embodiments of the disclosure.

According to an embodiment of the disclosure, the first message frame may include an uplink multi-user power capability information element. For the convenience of description, in the following text, the uplink multi-user power capability information element according to the embodiment of the disclosure can be referred to as an extremely high throughput uplink multi-user power capability information element, abbreviated as "EHT UL MU power capability information element". In some embodiments of the disclosure, the first message frame can be an association request frame or a re-association request frame. However, this is only exemplary, and the embodiments of the disclosure are not limited to this, and other types of frames are also feasible. The station (non AP HE (High Efficiency) STA) can use the EHT (extremely High Throughput) UL (Uplink) MU (multi-user) power capability information element or reuse an existing HE UL MU power capability information element in the association request frame or the re-association request frame, so as to notify the access point (HE AP) that the station is capable to send a relative maximum transmission power of a HE TB (trigger-based) PPDU (high efficiency trigger-based PPDU). The access point (HE AP) can allocate an uplink transmission resource to the station (non AP HE STA) based on the EHT UL MU power capability information element.

According to embodiments of the disclosure, the EHT UL MU power capability information element can be encapsulated in the first message frame, and examples of encapsulating the EHT UL MU power capability information elements will be described in detail below with reference to Tables 2 to 5.

The following will first describe the EHT UL MU power capability information element according to the embodiments of the disclosure. In an embodiment of the disclosure, the EHT UL MU power capability information element is redesigned/set to additionally support the 4096 QAM in the IEEE802.11be standard.

In an embodiment of the disclosure, for ease of description, the 4096 QAM can be represented by $R=\frac{3}{4}$ and $R=\frac{5}{6}$ (R: a coding rate), and modulation and coding scheme (MCS) index numbers corresponding to the 4096 QAM can be 12 and 13. However, this is only exemplary, and it is not limited in the embodiments of the disclosure. According to an embodiment of the disclosure, the EHT UL MU power capability information element may include an identifier bit for indicating a relative maximum transmission power related to various modulation modes. Such identifier bit can be used to indicate/identify a maximum power value that the station sends an uplink data frame, and each identifier bit can correspond to a modulation coding strategy. In an embodiment of the disclosure, considering the IEEE 802.11be standard, the MCS according to the embodiments of the disclosure can be referred to as extremely high throughput (EHT)/high efficient (HE) MCS.

According to embodiments, the EHT UL MU power capability information element can include: first information identifiers respectively related to relative maximum transmission powers of QPSK, 16-QAM, 64-QAM, 256-QAM, and 1024-QAM modulation modes, and/or a second information identifier related to a relative maximum transmission power of 4096 QAM modulation modes. Both the first information identifiers and the second information identifier can be used to indicate/identify the maximum power value that the station sends the uplink data frame. It should be understood that, although the EHT UL MU power capability information element described in the disclosure includes the first information identifiers and/or the second information identifier, both the first information identifiers and the second information identifier can be set in the same field of the EHT UL MU power capability information element to identify the relative maximum transmission power.

According to an embodiment, the first information identifiers can respectively correspond to an MCS with index numbers ranging from a first vale to a second value, and the second information identifier can correspond to an MCS that has an index number different from the index numbers ranging from the first value to the second value. In other words, the index number of the MCS corresponding to the first information identifier can be set to ranging from the first value to the second value (for example, ranging from "EHT/HE MCS 1" to "EHT/HE MCS 11" in Table 1 below). The index number of the MCS corresponding to the second information identifier can be different from the index numbers ranging from the first value to the second value (for example, "EHT/HE MCS 12" and "EHT/HE MCS 13" in Table 1 below), which will be described in detail with reference to Table 1.

According to an embodiment, the EHT UL MU power capability information element may include an element identifier extension bit (for example, the "Element ID extension" in Table 1 below). In the embodiments of the disclosure, the element identifier extension bit can be set to indicate a specific value of the EHT UL MU power capability information element.

In the case where a station STA supporting the IEEE802.11be standard communicates with an access point AP supporting the IEEE802.11be standard (for example, when they perform initial association connection), as an example only, the EHT UL MU power capability information element according to the embodiments of the disclosure may have a format shown in Table 1.

Relative MAX transmit power EHT/HE MCS 1 to the Relative MAX transmission power EHT/HE MCS 11 can correspond to QPSK, 16-QAM, 64-QAM, 256-QAM, and 1024-QAM modulation modes. That is to say, the EHT UL MU power capability information element according to the embodiments of the disclosure can support both the IEEE 802.11ax stander and the IEEE 802.11be standard.

Referring to Table 1, the second information identifier in the EHT UL MU power capability information element can correspond to the Relative MAX transmit power EHT/HE MCS 12 (relative maximum transmission power EHT/HE MCS 12) and the Relative MAX transmit power EHT/HE MCS13 (relative maximum transmission power EHT/HE MCS13). That is, the Relative MAX transmit power EHT/HE MCS 12 and the Relative MAX transmit power EHT/HE MCS 13 can correspond to the 4096 QAM modulation mode.

In Table 1, the relative maximum transmission power EHT/HE-MCS n (where n=1, . . . , 13) is an unsigned integer in dB, and in the case of using HE TB PPDU with a resource unit (RU) size greater than or equal to 242 subcarriers, each relative maximum transmission power EHT/HE-MCS n contains a difference (in dBm) between a maximum transmission power for HE-MCS 0 and a maximum transmission power for HE-MCS n.

In an embodiment of the disclosure, even if the station cannot support a certain/some EHT/HE MCS, its/their corresponding fields can be retained. In another embodiment of the disclosure, the station may retain only fields of EHT/HE MCS that it can support. That is to say, the EHT UL MU power capability information element can include at least a portion of the first information identifiers and the second information identifier.

In the following, an embodiment where the EHT UL MU power capability information element is encapsulated in the first message frame will be described in detail.

In an embodiment of the disclosure, the EHT UL MU power capability information element can be at a multi-link device level. In this case, the station can carry the EHT UL

TABLE 1

| Format of EHT UL MU power capability information element | | | | | | | |
|---|---|---|---|---|---|---|---|
| Element | Length | Element ID extension | Relative MAX transmit power EHT/HE MCS1 | . . . | Relative MAX transmit power EHT/HE MCS11 | Relative MAX transmit power EHT/HE MCS12 | Relative MAX transmit power EHT/HE MCS13 |

According to an embodiment, in Table 1, a sub field of the element identifier (Element ID) can be set to 255, and the element identifier extension bit (Element ID extension) can be set to a specific value (such as 61) to indicate/identify the EHT UL MU power capability information element according to the embodiments of the disclosure.

Referring to Table 1, the first information identifiers in the EHT UL MU power capability information element can correspond to a range from the Relative MAX transmit power EHT/HE MCS 1 (relative maximum transmission power EHT/HE MCS 1) to the Relative MAX transmit power EHT/HE MCS 11 (relative maximum transmission power EHT/HE MCS 11). That is, the range from the MU power capability information element in the first message frame (such as an association request frame or a re-association request frame). For example, the EHT UL MU power capability information element can be included in a frame body of the first message frame.

In an example where the first message frame is an association request frame, when the association request frame carries the EHT UL MU power capability information element, as an example, the frame body of the association request frame can be shown in Table 2 below.

TABLE 2 frame body of the Association Request frame

| Order | Information | Notes |
| --- | --- | --- |
| 13 | HT Capabilities | When dot11HighThroughputOptionImplemented is true, and STA is not 6 GHz STA, the capability exists |
| 22 | VHT Capabilities | When dot11VHTOptionIm-plemented is true, and STA is not 6 GHz STA, the capability exists |
| 45 | HE Capabilities | When dot11HEOptionImplemented is true, the capability exists; otherwise, the capability does not exist |
| 46 | Channel Switch Timing | When dot11HESubchannelSelectiveTransmissionImplemented is true, the capability exists; otherwise, the capability does not exist |
| 47 | HE 6 GHz Band Capabilities | When dot11HEOptionImplemented and dot11HE6GOptionImplemented are true, the capability exists; otherwise, the capability does not exist |
| 48 | UL MU Power Capabilities | When dot11HEOptionImplemented is true, the capability exists; otherwise, the capability does not exist |
| 49 | EHT UL MU Power Capabilities | When dot11HEOptionImplemented is true, the capability exists; otherwise, the capability does not exist |

The orders (Order) in Table 2 represent positions of corresponding capabilities in the association request frame, and an order not shown (for example, 13) represents a position occupied by other standards. According to an embodiment, the order of EHT UL MU power capability information element can be defined as 49, that is, at the $49^{th}$ position in the association request frame, there can be the EHT UL MU power capability information element as shown in Table 1. However, this order/position is only exemplary, and the EHT UL MU power capability information element can be located at other suitable positions in the frame body of the first message frame. For example, in order to consider the problem of coexistence, i.e., a device that supports the IEEE 802.11ax standard and a device that supports the IEEE 802.11be standard existing in the same BSS, the UL MU power capability information element can be reused, that is, the $48^{th}$ position in the frame body can be reused. In this case, the $49^{th}$ position can be omitted in Table 2.

In an example where the first message frame is a re-association request frame, when the re-association request frame carries the EHT UL MU power capability information element, as an example, a frame body of the re-association request frame can be shown in Table 3 below.

In Table 3, the order of the EHT UL MU power capability information element can be defined as 54, that is, at the $54^{th}$ position in the re-association request frame, there can be the EHT UL MU power capability information element as shown in Table 1. However, this order/position is only exemplary, and the EHT UL MU power capability information element can be located at other suitable positions in the frame body of the first message frame. For example, in order to consider the problem of coexistence, i.e., a device that supports the IEEE 802.11ax standard and a device that supports the IEEE 802.11be standard existing in the same BSS, the UL MU power capability information element can be reused, that is, the $54^{th}$ position in the frame body can be reused. In this case, the $54^{th}$ position can be omitted in Table 3.

In another embodiment of the disclosure, the EHT UL MU power capability information element may be of a link level. In this case, the EHT UL MU power capability information element can be encapsulated in a multi-link information element (ML element) field of the first message frame, and the multi-link information element can be set in the first message frame. For example, the multi-link information element field can be an element information field with a variable length of the first message frame (such as the

TABLE 3 frame body of the Re-Association Request frame

| Order | Information | Notes |
| --- | --- | --- |
| 16 | HT Capabilities | When dot11HighThroughputOptionImplemented is true, and STA is not 6 GHz STA, the capability exists |
| 27 | VHT Capabilities | When dot11VHTOptionImplemented is true, and STA is not 6 GHz STA, the capability exists |
| 50 | HE Capabilities | When dot11HEOptionImplemented is true, the capability exists; otherwise, the capability does not exist |
| 51 | Channel Switch Timing | When dot11HESubchannelSelectiveTransmissionImplemented is true, the capability exists; otherwise, the capability does not exist |
| 52 | HE 6 GHz Band Capabilities | When dot11HEOptionImplemented and dot11HE6GOptionImplemented are true, the capability exists |
| 53 | UL MU Power Capabilities | When dot11HEOptionImplemented is true, the capability exists; otherwise, the capability does not exist |
| 54 | EHT UL MU Power Capabilities | When dot11HEOptionImplemented is true, the capability exists; otherwise, the capability does not exist | association request frame and the re-association request frame). The multi-link information element can be used to indicate configuration information of multiple links supported by the station, and its specific format can be shown in Table 4 below.

TABLE 4 format of ML Element

| | Element ID | Length | Element ID Extension | Multi-Link Control | MLD MAC Address | TBD | Optional Subelements |
|---|---|---|---|---|---|---|---|
| Octets | 1 | 1 | 1 | 2 | 0 or 6 | TBD | variable |

In Table 4, the EHT UL MU power capability information element can be a sub element of the multi-link information element. That is, the EHT UL MU power capability information element having the format shown in Table 1 can be encapsulated in optional sub elements. For example, the Optional Subelements can have a format shown in Table 5 below.

TABLE 5 format of Optional Subelements

| | Link ID | Complete Profile | EHT UL MU power capabilities |
|---|---|---|---|
| Bits: | TBD | 1 | TBD |

In Table 5, the sub elements of the multi-link element field can include a link identifier (Link ID), a complete profile, and an EHT UL MU power capability information element. In an example of the disclosure, the link identifier included in the multi-link information element can be used to indicate a link that sends the first message frame. The Complete Profile can be used to indicate an entire attribute of the station. The EHT UL MU power capability information element can have the format and content shown in Table 1.

In the case of where a station STA that supports the IEEE802.11be standard communicates with an access point AP that supports the IEEE802.11ax standard (for example, during their initial association connection), the station STA can support the 4096 QAM, but the access point AP cannot support it. Therefore, the uplink multi-user power capability information element carried in the first message frame can only include the first information identifiers respectively related to relative maximum transmission powers of QPSK, 16-QAM, 64-QAM, 256-QAM and 1024-QAM modulation modes, i.e., the uplink multi-user power capability information element shown in Table 6 below. Similar to the examples described in Tables 2 to 5, the uplink multi-user power capability information element shown in Table 6 can also be encapsulated in the first message frame. For simplicity, repeated descriptions are omitted here.

TABLE 6 format of uplink multi-user power capability information element

| Element ID | Length | Element ID extension | Relative MAX transmit power HE MCS1 | . . . | Relative MAX transmit power HE MCS11 |
|---|---|---|---|---|---|

Referring back to FIG. 2, in step 220, the first message frame determined in step 210 can be sent. For example, the station can send the first message frame encapsulated with the uplink multi-user power capability information element as shown in Table 1 or Table 6 to the access point. When receiving the first message frame, the access point can plan uplink resources reasonably based on the uplink multi-user power capability information element to improve spectral efficiency and network throughput.

Those skilled in the art can understand that steps 210 and 220 are only exemplary, and steps 210 and 220 can be performed separately or in combination, which is not limited herein.

Figure 3:
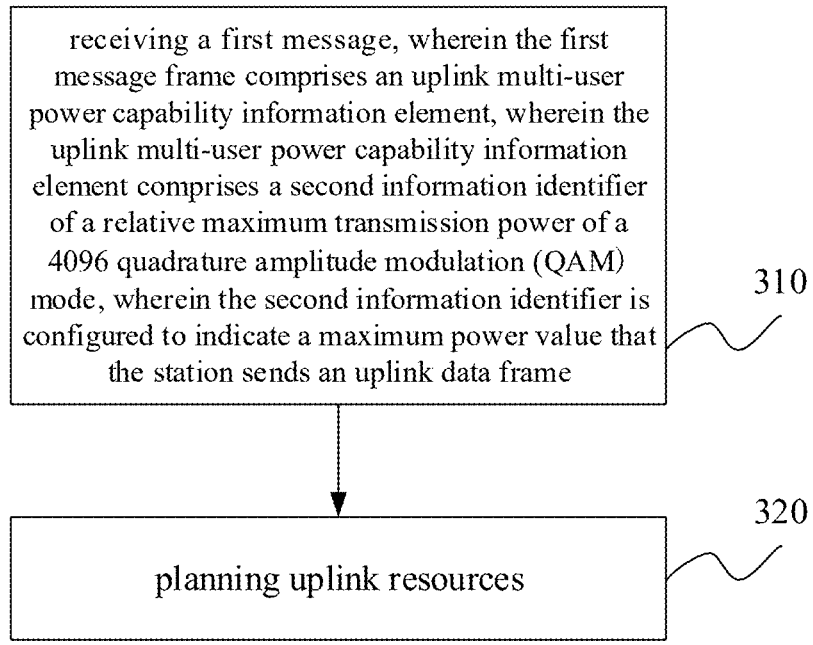
FIG. 3 is a flowchart of a communication method according to another embodiment of the disclosure.

FIG. 3 is a flowchart of a communication method according to another embodiment of the disclosure. The communication method shown in FIG. 3 can be performed by an access point.

As illustrated in FIG. 3, in step 310, a first message frame may be received from a station. According to an embodiment, the first message frame includes an uplink multi-user power capability information element. The uplink multi-user power capability information element includes a second information identifier of a relative maximum transmission power of a 4096 quadrature amplitude modulation (QAM) mode. The second information identifier is configured to indicate a maximum power value that the station sends an uplink data frame. According to an embodiment, the uplink multi-user power capability information element further includes first information identifiers respectively related to relative maximum transmission powers of QPSK, 16-QAM, 64-QAM, 256-QAM, and 1024-QAM modulation modes.

The first message frame and the uplink multi-user power capability information element can be similar to the above descriptions with reference to Tables 1 to 6. For conciseness, repeated descriptions are omitted here.

In step 320, uplink resources can be planned based on the uplink multi-user power capability information element. Various strategies and schemes can be adopted to plan the uplink resources, and it is not limited in embodiments of the disclosure.

Those skilled in the art can understand that steps 310 and 320 are only exemplary, and steps 310 and 320 can be executed separately or in combination, which is not limited herein.

Figure 4:
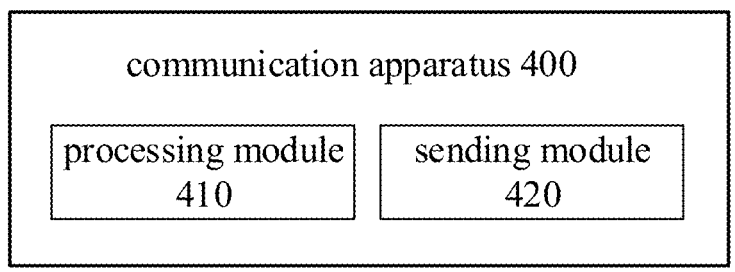
FIG. 4 is a block diagram of a communication apparatus according to an embodiment of the disclosure.

FIG. 4 is a block diagram of a communication apparatus according to an embodiment of the disclosure. The communication apparatus 400 shown in FIG. 4 can be implemented by a station.

As illustrated in FIG. 4, the communication apparatus 400 may include a processing module 410 and a sending module 420. The processing module 410 may be configured to determine a first message frame. The sending module 420 may be configured to send the first message frame.

According to an embodiment, the first message frame may include an uplink multi-user power capability information element. The uplink multi-user power capability information element may include a second information identifier of a relative maximum transmission power of a 4096 quadrature amplitude modulation (QAM) mode. The second information identifier may be configured to indicate a maximum power value that the station sends an uplink data frame. According to an embodiment, the uplink multi-user power capability information element may further include first information identifiers respectively related to relative maximum transmission powers of QPSK, 16-QAM, 64-QAM, 256-QAM, and 1024-QAM modulation modes. According to an embodiment, the first information identifiers may respectively correspond to MCS with index numbers ranging from a first value to a second value. The second information identifier may correspond to an MCS that has an index number different from the index numbers ranging from the first value to the second value. According to an embodiment, the uplink multi-user power capability information element may further include an information element identifier extension bit. The information element identifier extension bit may be configured to indicate a specific value of the uplink multi-user power capability information element. According to an embodiment, the uplink multi-user power capability information element may be included/encapsulated in a frame body of the first message frame. According to another embodiment, the uplink multi-user power capability information element may be included/encapsulated in a multi-link information element field of the first message frame. The multi-link information element field may include an identifier used to indicate a link sending the first message frame. The first message frame and the uplink multi-user power capability information element can be similar to the above descriptions with reference to Tables 1 to 6. For conciseness, repeated descriptions are omitted here.

The communication apparatus 400 can execute the communication method described with reference to FIG. 2, and for conciseness, repeated descriptions are omitted here. In addition, the communication apparatus 400 shown in FIG. 4 is only exemplary, and the embodiments of the disclosure are not limited to this. For example, the communication apparatus 400 may also include other modules, such as a memory module, etc. In addition, various modules in the communication apparatus 400 can be combined into more complex modules or divided into more individual modules to support various functions. For example, the sending module 420 can be a transceiver with transmission and reception functions.

Figure 5:
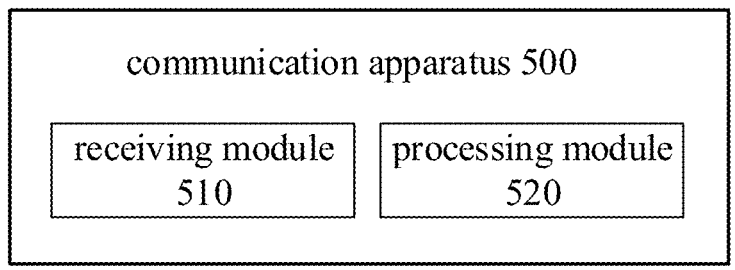
FIG. 5 is a block diagram of a communication apparatus according to another embodiment of the disclosure.

FIG. 5 is a block diagram of a communication apparatus according to another embodiment of the disclosure. The communication apparatus 500 shown in FIG. 5 can be implemented by an access point.

As illustrated in FIG. 5, the communication apparatus 500 may include a receiving module 510 and a processing module 520. The receiving module 510 may be configured to receive a first message frame from a station. According to an embodiment, the first message frame may include an uplink multi-user power capability information element. The uplink multi-user power capability information element may include a second information identifier of a relative maximum transmission power of a 4096 quadrature amplitude modulation (QAM) mode. The second information identifier may be configured to indicate a maximum power value that the station sends an uplink data frame. The processing module 520 may be configured to plan uplink resources based on the uplink multi-user power capability information element.

According to an embodiment, the uplink multi-user power capability information element may further include first information identifiers respectively related to relative maximum transmission powers of QPSK, 16-QAM, 64-QAM, 256-QAM, and 1024-QAM modulation modes. According to an embodiment, the first information identifiers may respectively correspond to MCS with index numbers ranging from a first value to a second value. The second information identifier may correspond to an MCS that has an index number different from the index numbers ranging from the first value to the second value. According to an embodiment, the uplink multi-user power capability information element may further include an information element identifier extension bit. The information element identifier extension bit may be configured to indicate a specific value of the uplink multi-user power capability information element. According to an embodiment, the uplink multi-user power capability information element may be included/encapsulated in a frame body of the first message frame. According to another embodiment, the uplink multi-user power capability information element may be included/encapsulated in a multi-link information element field of the first message frame. The multi-link information element field may include an identifier used to indicate a link sending the first message frame. The first message frame and the uplink multi-user power capability information element can be similar to the above descriptions with reference to Tables 1 to 6. For conciseness, repeated descriptions are omitted here.

The communication apparatus 500 can execute the communication method described with reference to FIG. 3, and for conciseness, repeated descriptions are omitted here. In addition, the communication apparatus 500 shown in FIG. 5 is only exemplary, and the embodiments of the disclosure are not limited to this. For example, the communication apparatus 500 may also include other modules, such as a memory module, etc. In addition, various modules in the communication apparatus 500 can be combined into more complex modules or divided into more individual modules to support various functions. For example, the receiving module 510 can be a transceiver with transmission and reception functions.

The communication methods and the communication apparatus described in FIGS. 2 to 5 can meet the requirements of the IEEE802.11be standard, which is beneficial for the access point to plan the uplink resources reasonably based on the uplink multi-user power capability information element, thereby improving spectral efficiency and network throughput.

Based on the same principles as the methods provided in the embodiments of the disclosure, the embodiments of the disclosure also provide an electronic device, which includes a processor and a memory. The memory stores machine-readable instructions (also known as "computer programs"). The processor is configured to execute the machine-readable instructions to implement the method described with reference to FIG. 2 and FIG. 3.

Embodiments of the disclosure also provide a computer readable storage medium, on which a computer program is stored. When the computer program is executed by a processor, the method described with reference to FIG. 2 or FIG. 3 is implemented.

In an embodiment, the processor can be used to implement or execute various exemplary logical blocks, modules, and circuits described with reference to the disclosure, such as a CPU (Central Processing Unit), a general-purpose processor, a DSP (Digital Signal Processor), an ASIC (Application Specific Integrated Circuit), a FPGA (Field Programmable Gate Array) or other programmable logic devices, transistor logic devices, hardware components, or any combination thereof. The processor can also be a combination of computing functions, such as a combination of one or more microprocessors, a combination of DSP and microprocessors, etc.

In an embodiment, the memory can be, for example, a ROM (Read Only Memory), a RAM (Random Access Memory), an EEPROM (Electrically Erasable Programmable Read Only Memory), a CD-ROM (Compact Disc Read Only Memory), or other optical disc storage, optical disk storage (including compact disc, laser disc, optical disc, digital universal disc, Blu-ray Disc, etc.), a disk storage medium or other magnetic storage devices, or any other medium that can be used to carry or store program codes in the form of instructions or data structures and can be accessed by computers, which is not limited to this.

It should be understood that, although the steps in the flowchart in the accompanying drawings are displayed sequentially according to the arrows, these steps are not necessarily executed in the order indicated by the arrows. Unless explicitly stated herein, there is no strict order limit for the execution of these steps, which can be executed in other orders. In addition, at least a portion of the steps in the flowchart of the accompanying drawings may include multiple sub steps or stages, which may not necessarily be completed at the same time, but may be executed at different times, and their execution order may not necessarily be sequential, but they may be executed alternately with at least a portion of other steps or the sub steps or stages of other steps.

Although the disclosure is illustrated and described with reference to certain embodiments of the disclosure, those skilled in the art should understand that various changes in form and details may be made without departing from the scope of the present disclosure. Therefore, the scope of the disclosure should not be limited to the embodiments, but should be determined by the appended claims and their equivalents.

What is claimed is:

1. A communication method, performed by a station, comprising:
    determining a first message frame, wherein the first message frame comprises an uplink multi-user power capability information element, wherein the uplink multi-user power capability information element comprises a second information identifier of a relative maximum transmission power of a 4096 quadrature amplitude modulation (QAM) mode, wherein the second information identifier is configured to indicate a maximum power value that the station sends an uplink data frame; and
    sending the first message frame.

2. The communication method according to claim 1, wherein the uplink multi-user power capability information element further comprises first information identifiers respectively related to relative maximum transmission powers of QPSK, 16-QAM, 64-QAM, 256-QAM, and 1024-QAM modulation modes.

3. The communication method according to claim 2, wherein the first information identifiers respectively correspond to MCS with index numbers ranging from a first value to a second value.

4. The communication method according to claim 3, wherein the second information identifier corresponds to an MCS that has an index number different from the index numbers ranging from the first value to the second value.

5. The communication method according to claim 1, wherein the uplink multi-user power capability information element is comprised in a frame body of the first message frame.

6. The communication method according to claim 1, wherein the uplink multi-user power capability information element is comprised in a multi-link information element field of the first message frame.

7. The communication method according to claim 6, wherein the multi-link information element field comprises an identifier used to indicate a link sending the first message frame.

8. The communication method according to according to claim 1, wherein the uplink multi-user power capability information element comprises an information element identifier extension bit.

9. The communication method according to claim 8, wherein the information element identifier extension bit is configured to indicate a fifth value of the uplink multi-user power capability information element.

10. A communication method, performed by an access point, comprising:
    receiving a first message frame from a station, wherein the first message frame comprises an uplink multi-user power capability information element, wherein the uplink multi-user power capability information element comprises a second information identifier of a relative maximum transmission power of a 4096 quadrature amplitude modulation (QAM) mode, wherein the second information identifier is configured to indicate a maximum power value that the station sends an uplink data frame.

11. The communication method according to claim 10, wherein the uplink multi-user power capability information element further comprises first information identifiers respectively related to relative maximum transmission powers of QPSK, 16-QAM, 64-QAM, 256-QAM, and 1024-QAM modulation modes.

12. The communication method according to claim 11, wherein the first information identifiers respectively correspond to MCS with index numbers ranging from a first value to a second value.

13. The communication method according to claim 12, wherein the second information identifier corresponds to an MCS that has an index number different from the index numbers ranging from the first value to the second value.

14. The communication method according to claim 10, wherein the uplink multi-user power capability information element is comprised in a frame body of the first message frame.

15. The communication method according to claim 10, wherein the uplink multi-user power capability information element is comprised in a multi-link information element field of the first message frame.

16. The communication method according to claim 15, wherein the multi-link information element field comprises an identifier used to indicate a link sending the first message frame.

17. The communication method according to claim 10, wherein the uplink multi-user power capability information element comprises an information element identifier extension bit.

18. The communication method according to claim 17, wherein the information element identifier extension bit is configured to indicate a fifth value of the uplink multi-user power capability information element.

19. A electronic device, comprising:
a processor; and
a memory for storing computer programs executable on the processor;
wherein when the processor executes the computer programs, a communication method is implemented, the communication method comprising:
determining a first message frame, wherein the first message frame comprises an uplink multi-user power capability information element, wherein the uplink multi-user power capability information element comprises a second information identifier of a relative maximum transmission power of a 4096 quadrature amplitude modulation (QAM) mode, wherein the second information identifier is configured to indicate a maximum power value that a station sends an uplink data frame; and
sending the first message frame.

20. A non-transitory computer readable storage medium having computer programs stored thereon that, when executed by a processor, the communication method of claim 10, is implemented.

* * * * *